(12) United States Patent
Fan

(10) Patent No.: US 6,192,155 B1
(45) Date of Patent: Feb. 20, 2001

(54) SYSTEMS AND METHODS FOR REDUCING BOUNDARY ARTIFACTS IN HYBRID COMPRESSION

(75) Inventor: Zhigang Fan, Webster, NY (US)

(73) Assignee: Xerox Corporation, Rochester, NY (US)

( * ) Notice: Under 35 U.S.C. 154(b), the term of this patent shall be extended for 0 days.

(21) Appl. No.: 09/154,312

(22) Filed: Sep. 16, 1998

(51) Int. Cl.$^7$ .................................................. G06K 9/00
(52) U.S. Cl. ............................................ 382/232; 382/243
(58) Field of Search .................................... 382/232, 266, 382/268, 269, 275, 173, 177, 179, 180, 181, 233, 235, 236, 238, 239, 240, 241, 242, 243, 245, 251; 358/433

(56) References Cited

U.S. PATENT DOCUMENTS

| | | | |
|---|---|---|---|
| 5,539,842 | * 7/1996 | Schwartz | 382/232 |
| 5,673,376 | * 9/1997 | Ray et al. | 395/127 |
| 5,751,861 | * 5/1998 | Astle | 382/250 |
| 5,774,597 | * 6/1998 | Wilson | 382/250 |
| 5,778,105 | * 7/1998 | Shively | 382/269 |
| 5,852,681 | * 12/1998 | Amaratunga et al. | 382/268 |
| 5,903,681 | * 5/1999 | Rueby et al. | 382/266 |
| 5,937,101 | * 8/1999 | Jeon et al. | 382/268 |
| 6,014,466 | * 1/2000 | Xia et al. | 382/243 |

\* cited by examiner

*Primary Examiner*—Bijan Tadayon
*Assistant Examiner*—Ali Bayat
(74) *Attorney, Agent, or Firm*—Oliff & Berridge PLC

(57) ABSTRACT

A recursive dilation method and apparatus reduces the boundary artifacts occurring in hybrid compression. Documents containing both pictures and text are most efficiently compressed using a first compression standard for the picture region and a second compression standard for the text region, and thus inherently produce boundary blocks of both types, but such boundary blocks are most efficiently compressed when they contain only picture data and completely contain picture data, or only text data and completely contain text data. The non-picture data or non-text data in such boundary blocks can be considered "missing" data. The recursive dilation method and apparatus assigns the values of the boundary pixels to the neighboring pixels which have missing data.

20 Claims, 9 Drawing Sheets

FIG. 8

|   | 0 | 1 | 2 | 3 | 4 | 5 | 6 | 7 |
|---|---|---|---|---|---|---|---|---|
| 0 |   |   |   |   |   | y40 | y40 | y40 |
| 1 |   |   |   |   |   | y41 | y41 | y41 |
| 2 |   |   |   |   |   | y42 | y42 | y42 |
| 3 |   |   |   |   |   | y43 | y43 | y43 |
| 4 |   |   |   |   |   | y44 | y44 | y44 |
| 5 |   |   |   |   |   | y45 | y45 | y45 |
| 6 |   |   |   |   |   | y46 | y46 | y46 |
| 7 |   |   |   |   |   | y47 | y47 | y47 |

REGION BOUNDARY

|   | 0 | 1 | 2 | 3 | 4 | 5 | 6 | 7 |
|---|---|---|---|---|---|---|---|---|
| 0 | y02 | y12 | y22 | y32 | y42 | y52 | y62 | y72 |
| 1 | y02 | y12 | y22 | y32 | y42 | y52 | y62 | y72 |
| 2 |   |   |   |   |   |   |   |   |
| 3 |   |   |   |   |   |   |   |   |
| 4 |   |   |   |   |   |   |   |   |
| 5 |   |   |   |   |   |   |   |   |
| 6 |   |   |   |   |   |   |   |   |
| 7 |   |   |   |   |   |   |   |   |

REGION BOUNDARY

|   | 0 | 1 | 2 | 3 | 4 | 5 | 6 | 7 |
|---|---|---|---|---|---|---|---|---|
| 0 |   |   |   |   |   | y40 | y40 | y40 |
| 1 |   |   |   |   |   | y41 | y41 | y41 |
| 2 |   |   |   |   |   | y42 | y42 | y42 |
| 3 |   |   |   |   |   | y43 | y43 | y43 |
| 4 |   |   |   |   |   | y44 | y44 | y44 |
| 5 |   |   |   |   |   | y45 | y45 | y45 |
| 6 | y05 | y15 | y25 | y35 | y45 | y45 | y45 | y45 |
| 7 | y05 | y15 | y25 | y35 | y45 | y45 | y45 | y45 |

REGION BOUNDARY

|   | 0 | 1 | 2 | 3 | 4 | 5 | 6 | 7 |
|---|---|---|---|---|---|---|---|---|
| 0 |   |   |   |   |   |   |   |   |
| 1 |   |   |   |   |   |   |   |   |
| 2 |   |   |   |   |   |   |   |   |
| 3 |   |   |   |   |   | y52 or y43 | y62 | y72 |
| 4 |   |   |   |   |   | y44 | y62 or y44 | y72 |
| 5 |   |   |   |   |   | y45 | y45 | y72 or y45 |
| 6 |   |   |   |   |   | y46 | y46 | y46 |
| 7 |   |   |   |   |   | y47 | y47 | y47 |

REGION BOUNDARY

FIG. 11

SYSTEMS AND METHODS FOR REDUCING BOUNDARY ARTIFACTS IN HYBRID COMPRESSION

BACKGROUND OF THE INVENTION

1. Field of Invention

This invention generally relates to processing compressed digital images. More particularly, this invention relates to methods and systems which reduce the boundary ringing artifacts occurring in hybrid compression.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

A number of different compression techniques exist, and many of these are proprietary to individual users. The image compression standard disseminated by the Joint Photographic Experts Group (JPEG) committee is a compression technique which reduces data redundancies based on pixel-to-pixel correlations. Generally, picture regions of an image do not change very much on a pixel-to-pixel basis and therefore have what is known as "natural spatial correlation." In natural scenes, correlation is generalized, but not exact. Noise makes each pixel somewhat different from its neighbors.

Lempel-Ziv-Welsh (LZW) encoding, a popular run-length coding standard developed by J. Ziv and A. Lempel, and later refined by T. Welsh, is a technique for compressing data that takes advantage of repetition of strings in the data. Generally, raster data contains a high number of repetition. LZW compression is easy to implement, operates at high speed and results in high compression ratios without loss of data.

SUMMARY OF THE INVENTION

This invention is directed to the compression of images from documents which contain both pictures and text. Documents containing both pictures and text may be efficiently compressed using the JPEG standard for the picture regions and the LZW encoding technique for text regions.

The disadvantage of hybrid compression involving JPEG standards, for example, is that hybrid compression inherently produces boundary blocks with missing data. JPEG standards typically operate on M×M blocks and the block boundary is generally not aligned with the region boundary. Thus, as shown in FIG. 1, the picture blocks on the boundary, i.e., the boundary blocks 110, only partially contain picture data 112, where the rest is either text data or is missing altogether. Since text data cannot be efficiently compressed using the JPEG standard, all non-picture data within these boundary blocks is considered to be "missing data." FIG. 1 shows "missing data" 114 in the boundary blocks 110 occurring in conventional hybrid compression involving the JPEG standard.

The system and method of this invention improve the performance of the hybrid compression process by performing recursive dilation. This invention provides methods and apparatus that fill in the "missing data" without creating observable artifacts on the decompressed image data.

The compression/decompression method and system of this invention can be implemented, for example, by modifying basic JPEG compression/decompression engines and basic LZW compression/decompression engines. However, it should be appreciated that the compression method and system of this invention can be applied to any set of hybrid compression techniques, where one or both of the compression techniques compresses the image data on a block-by-block basis, such that there are boundary blocks containing more than one type of image data. Accordingly, the compression/decompression method and system can be applied to any number of systems, including digital printers and copiers, that need to provide compressed or decompressed images. A system implementing this invention can include data or image processing systems capable of compressing or decompressing images. The method and system described herein are efficient and result in smoother boundaries between regions of different image data types.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 8 shows an example of a recursive dilation process according to this invention;

FIG. 9 shows another example of a recursive dilation process according to this invention;

FIG. 10 shows another example of a recursive dilation process according to this invention; and FIG. 11 shows another example of a recursive dilation process according to this invention.

DETAILED DESCRIPTION OF PREFERRED EMBODIMENTS

Figure 1:
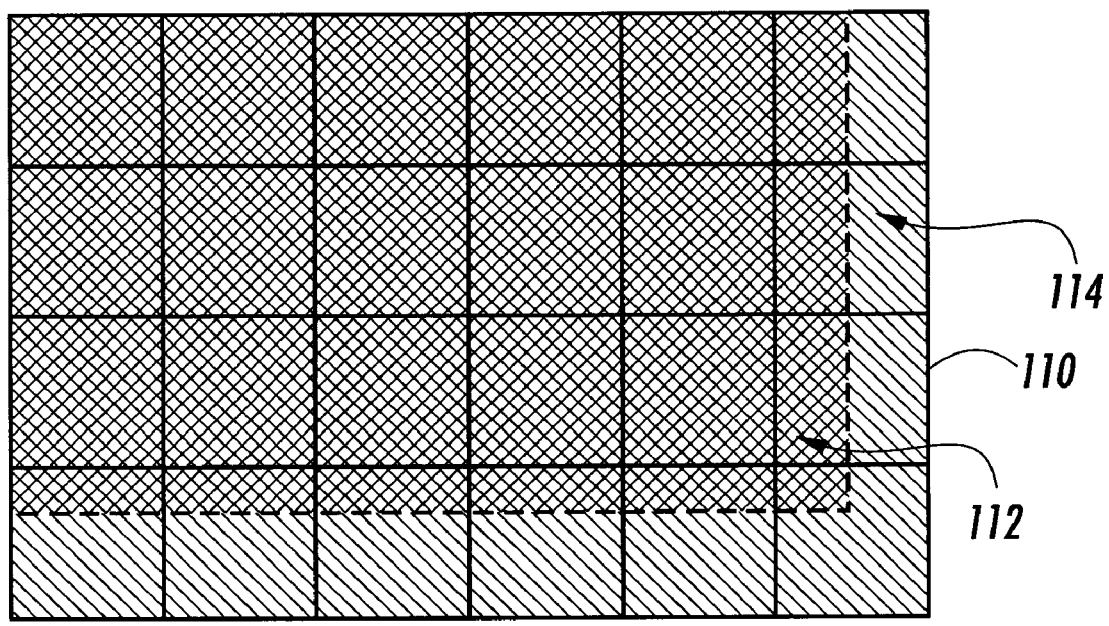
FIG. 1 shows "missing data" in the boundary blocks occurring in conventional hybrid compression involving JPEG standards.
Figure 2:
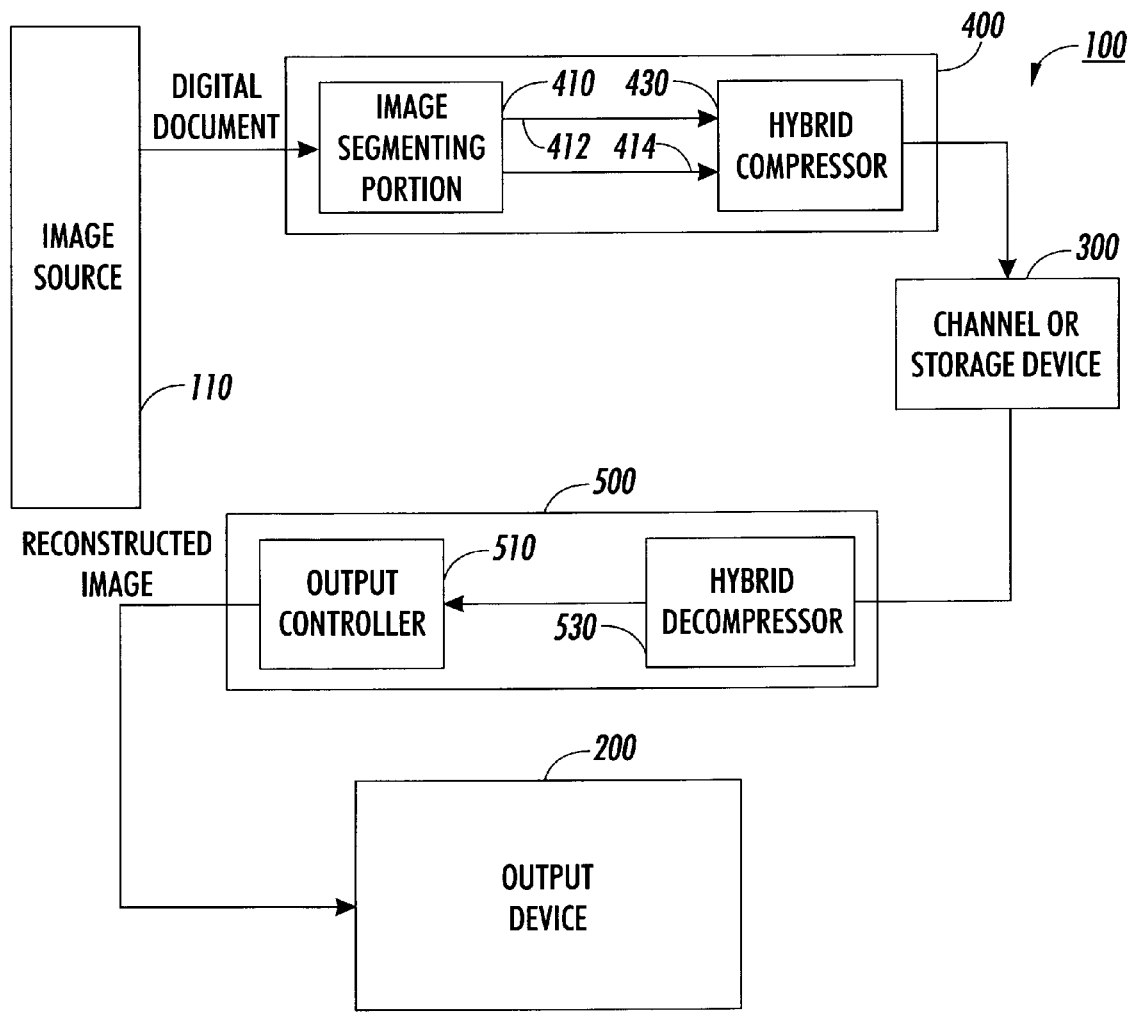
FIG. 2 is a generalized block diagram of one embodiment of a compression and decompression system according to this invention.

FIG. 2 shows a generalized functional block diagram of a compression and decompression system 100 according to this invention. The compression and decompression system 100 includes an image source 110 that may be any one of a number of different sources, such as a scanner, digital copier or facsimile device suitable for generating electronic image data or a device suitable for storing and/or transmitting the electronic image data, such as a client or server of a network. The electronic image data from the image source 110 is provided to an encoder 400 of the compression and decompression system.

In particular, the encoder 400 includes an image segmenting portion 410 that divides the electronic image data into a plurality of segments. The image is segmented into at least two different types of regions, blocked-data regions, such as picture regions, and non-blocked-data regions, such as text regions. That is, each segment contains either image data that is to be block compressed or image data that is to be non-block compressed, but not both. It should also be appreciated that the image can alternately be segmented into two different types of blocked-data regions, where each type of blocked data is compressed using a different compression technique. In one embodiment, the segmenting operation may be accomplished by windowing or cropping that enables transferring data comprising one or more segments of data from the input document to a segment memory of the encoder 400.

Once stored, the data is output by the image segmenting portion 410 over the signal lines 412 and 414 to a hybrid compressor 430. In particular, the blocked image data is output over the signal line 412 while the non-blocked image data image is output over the signal line 414. In the compressor 430, each of the segments of image data may be operated on using one of a variety of compression operations associated with the particular hybrid compression techniques to compress the image data within a segment.

Once compressed, each segment of the image data then is preferably transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, an optical drive and disk, flash memory or the like. Moreover, the storage device can be physically remote from the encoder 400 and/or the decoder 500, and reachable over the channel device described above.

When the images is to be decompressed, the segments of data are then preferably provided to and processed by the decoder 500. In particular, the decoder 500 includes a hybrid decompressor 530 that receives the segments of data from the channel or storage device 300 and an output controller 510 that pastes the decompressed segments from the hybrid decompressor 530 in their corresponding position in the decompressed image. Though the decoder 500 is shown in FIG. 2 as physically separate from the encoder 400, it should be understood that the decoder 500 and the encoder 400 may be different functional and/or structural aspects of a single physical device.

The output controller 510 sends the reconstructed image to the output device 200. It should be understood that the output device 200 can be any device that is capable of outputting the decompressed image data generated according to the invention such as a printer, facsimile device, a display device, or the like.

Figure 3:
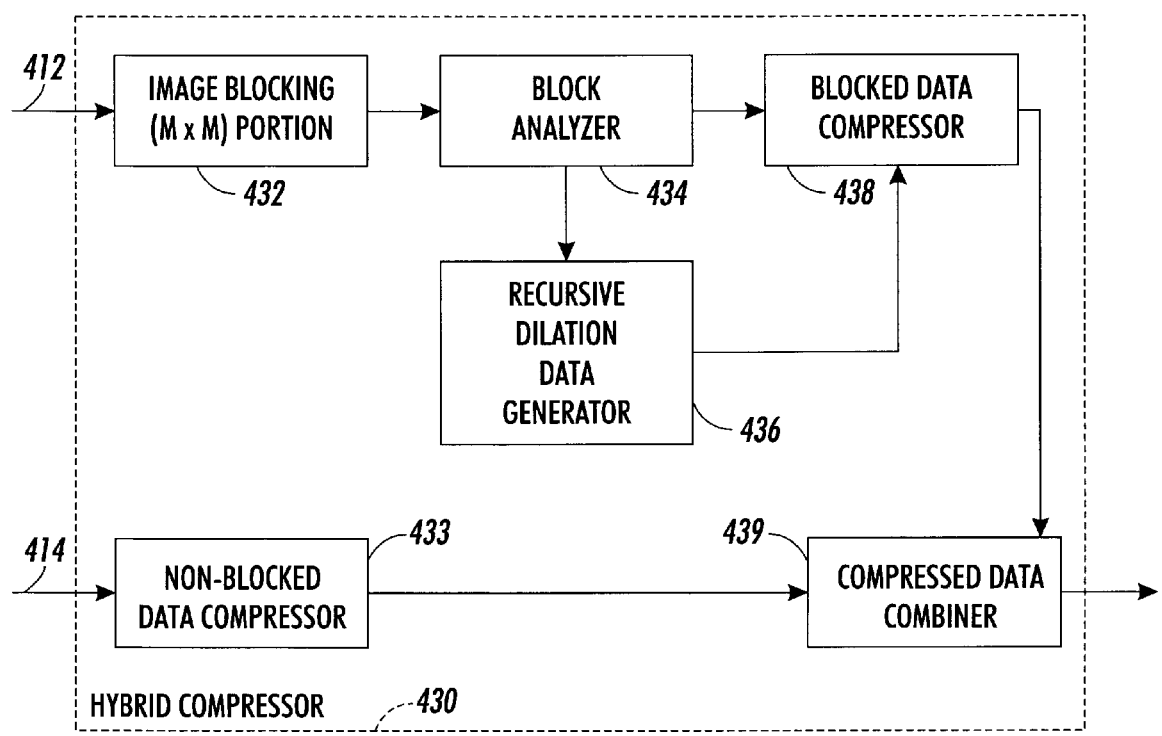
FIG. 3 shows one embodiment of a preferred hybrid compressor according to this invention.

FIG. 3 shows one embodiment of a hybrid compressor according to this invention. The hybrid compressor 430 includes an image blocking portion 432, a block analyzer 434 connected to the image blocking portion 432, a recursive dilation data generator 436 connected to the block analyzer 434, a blocked-data compressor 438 connected to the block analyzer 434 and the recursive dilation data generator 436, a non-blocked-data compressor 433, and a compressed data combiner 439 connected to the non-blocked-data compressor 433 and the blocked-data compressor 438. It should also be appreciated that this structure assumes that the image data is divided into only two types of image data, and that those types are picture data, which is a type of blocked image data which is compressed on a block-by-block basis, and text data, which is a type of non-blocked image data which is not compressed on a block-by-block basis. Accordingly, the following description will refer more generally to "blocked data" and "non-blocked data", rather than picture data and text data, respectively. It should be appreciated that, depending on the image to be compressed, the image may be divided into any number of data types, which includes any known or later developed data type, such as continuous tone or picture data, halftone data, line art or graphics data, text data or the like. Thus any set of compression techniques for these various data types can be used to form the hybrid compression technique, and the system and method of this invention can be used with any such set of compression techniques if one or more of those compress techniques compress the image data on a block-by-block basis.

It should further be appreciated that one of ordinary skill in the art can easily modify the structure shown in FIG. 3 complementary known or later-developed image type and/or only known or later developed compression technique without any undue experimentation or any unpredictability in the results of such modifications. Thus, while the scope of this disclosure is specifically intended to encompass all such combinations or sets of data types and/or hybrid compression techniques, currently known or later developed, that include one or more block compression techniques, it is not necessary to describe to one of ordinary skill in the art each such combination and the resulting modifications to the structure shown in FIG. 3.

It should also be appreciated that the structure shown in FIG. 3 also assumes that the non-blocked data is not compressed on a block-by-block basis, and thus does not have any "missing" data added. However, it should be appreciated that the text data may be compressed on a block-by-block basis, as described in copending application U.S. patent application Ser. No. 09/096,190 filed Jun. 12, 1998, incorporated herein by reference in its entirety. In such case, it should be appreciated that the image segmenting portion 410 may be combined with an image blocking portion to output image blocks to the hybrid compressor 430. That is, the systems and methods according to this invention require at least a portion of the image data to be blocked data. However, the systems and methods of this invention do not need any portion of the image data to be non-blocked data if the image data contains a plurality of different types of blocked image data that use a plurality of different block compression techniques.

In operation, after the image data is split into segments by the image segmenting portion 410, the blocked-data segments are input to the image blocking portion 432 and the non-blocked segments are input to the non-block data compressor 433. The blocks of blocked image data from the image blocking portion 432 are input to the block analyzer 434. The block analyzer 434 determines, for each block of image data, whether that block contains only image data, or both image data and missing data. If the block contains only image data, that block is output directly to the blocked-data compressor 438. However, if that block contains both image data and missing data, the block analyzer 434 outputs the blocked-data boundary block with the missing data to the recursive dilation data generator 436. The recursive dilation data generator 436 generates "false" image data from the actual image data of the blocked-data boundary block so that the blocked-data boundary block will be completely filled with blocked data. The "filled" blocked-data boundary block is then output to the blocked-data compressor 438.

The non-blocked-data segments are input to the non-blocked-data compressor 433. The non-blocked-data compressor 434 compresses the non-blocked data using a compression technique that efficiently compresses the non-blocked data, such as LZW (for text data) or any other known or later developed compression technique that efficiently compresses the non-blocked data. The compressed non-blocked data is then output to the compressed data combiner 439.

Similarly, the blocked-data compressor 438 inputs the blocks of blocked image data from the block analyzer 434 and the filled image data boundary blocks from the recursive dilation data generator 436 and compresses the blocks of blocked image data on a block-by-block basis using the JPEG standard (for picture data) or any other known or later developed compression technique that efficiently compresses the blocked data. The compressed blocks of blocked data are then output to the compressed data combiner 439.

The previous discussion assumes the image data is split into only one type of non-block data, such as text data, and only one type of blocked data, such as picture data. If other compression techniques for compressing other data types, such as those discussed above, are used in place of or in addition to the text and picture compression techniques, the image segmenting portion 410 will determine, for each segment, whether that segment contains a blocked type of data or a non-blocked type of data. If that segment of data contains non-blocked data, it will be output directly to the non-blocked compressor for that particular type of data. If that segment of data contains blocked data, it is then sent to an image blocking portion for that type of data.

The compressed data combiner 439 combines the compressed non-blocked data and the compressed blocked data into a single data structure, such as a file. The compressed data combiner 439 can also optionally apply a further level of compression, such as Huffman encoding, to the single data structure. The compressed data combiner 439 then outputs the single data file, whether further compressed or not, to the channel or storage device 300.

Figure 4:
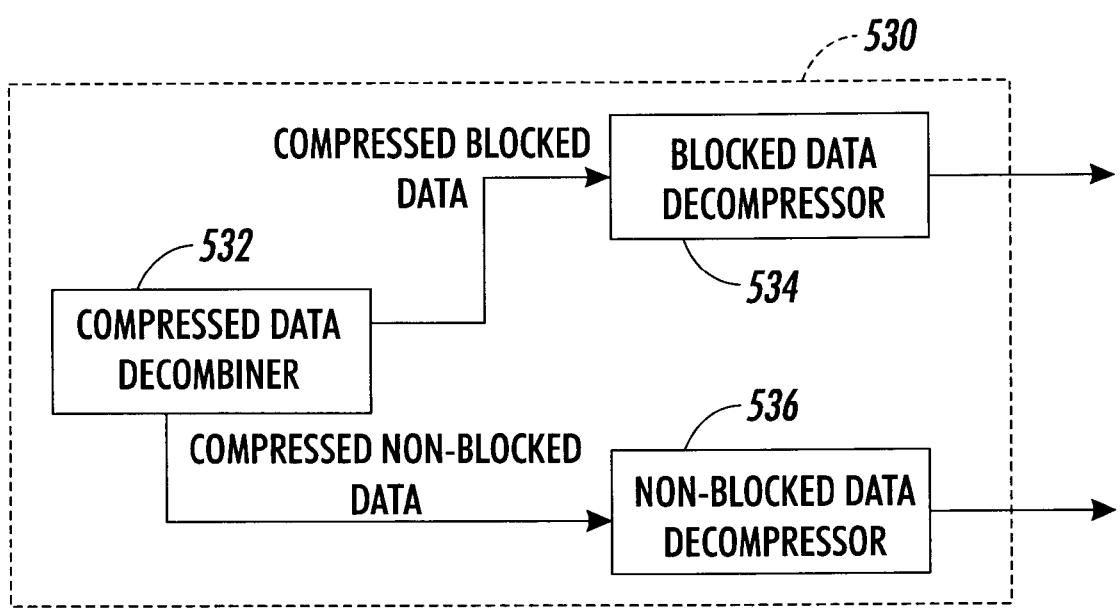
FIG. 4 shows one embodiment of a hybrid decompressor according to this invention.

FIG. 4 shows one embodiment of a hybrid decompressor according to this invention. In particular, the compressed image data is input into the hybrid decompressor 530. The hybrid decompressor 530 includes a compressed data decombiner 532, a blocked-data decompressor 534, and a non-blocked-data decompressor 536 connected to the compressed data decombiner 532. The compressed data decombiner 532 inputs the single data structure from the channel or storage device 300. If the single data structure has been further compressed, the compressed data decombiner 532 will first decompress it. The compressed data decombiner 532 then splits the single data structure into the compressed blocked data blocks and the compressed non-blocked data. The compressed blocked-data blocks are output to the blocked-data decompressor 534. The compressed non-blocked data is output to the non-blocked-data decompressor 536.

The blocked-data decompressor 534 decompresses the compressed blocked-data blocks and outputs the decompressed blocked-data blocks to the output controller 510. Similarly, the non-blocked-data decompressor 536 decompresses the compressed non-blocked data and outputs the decompressed segments of non-blocked data to the output controller 510. The output controller 510 recombines the decompressed blocked-data blocks and the decompressed segments of non-blocked data into a single output image. In particular, in one embodiment, the output controller 510 first pastes the blocked-data blocks, including the blocked-data boundary blocks, into their appropriate locations in the decompressed image. The output controller 510 then pastes the non-blocked-data segments into their appropriate locations. Thus, each non-blocked-data segment is pasted over the corresponding blocked-data boundary blocks. The boundary blocks are pasted in this order because the missing data in the blocked-data boundary blocks is replaced with non-background image data. This image data is false, and is removed by pasting the non-blocked-data segments over the corresponding blocked-data boundary block.

It should be appreciated that the above-outlined structures for the hybrid compressor 430 and the hybrid decompressor 530 are functional in nature. That is, FIGS. 3 and 4 show the functional organization of the hybrid compressor 430 and the hybrid decompressor 530, with each preferably being implemented on a general purpose computer. However, each of the hybrid compressor 430 and the hybrid decompressor 530 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, as set forth above, both of the hybrid compressor 430 and the hybrid decompressor 530 can be implemented on a single general purpose computer, a single special purpose computer, a single programmed microprocessor or microcontroller and peripheral integrated circuit elements, a single ASIC or other integrated circuit, a single digital signal processor, a single hardwired electronic or logic circuit such as a discrete element circuit, a single programmable logic device such as a PLD, PLA, FPGA or PAL, or the like.

In the compression portion of the method and system of this invention, the recursive dilation processor 436 progressively assigns the value of its neighboring pixels to a boundary pixel positioned in the boundary block adjacent to the boundary between the image data portion and the blank portion. In most cases, the region boundaries are vertical or horizontal straight lines, or corners.

Figure 5:
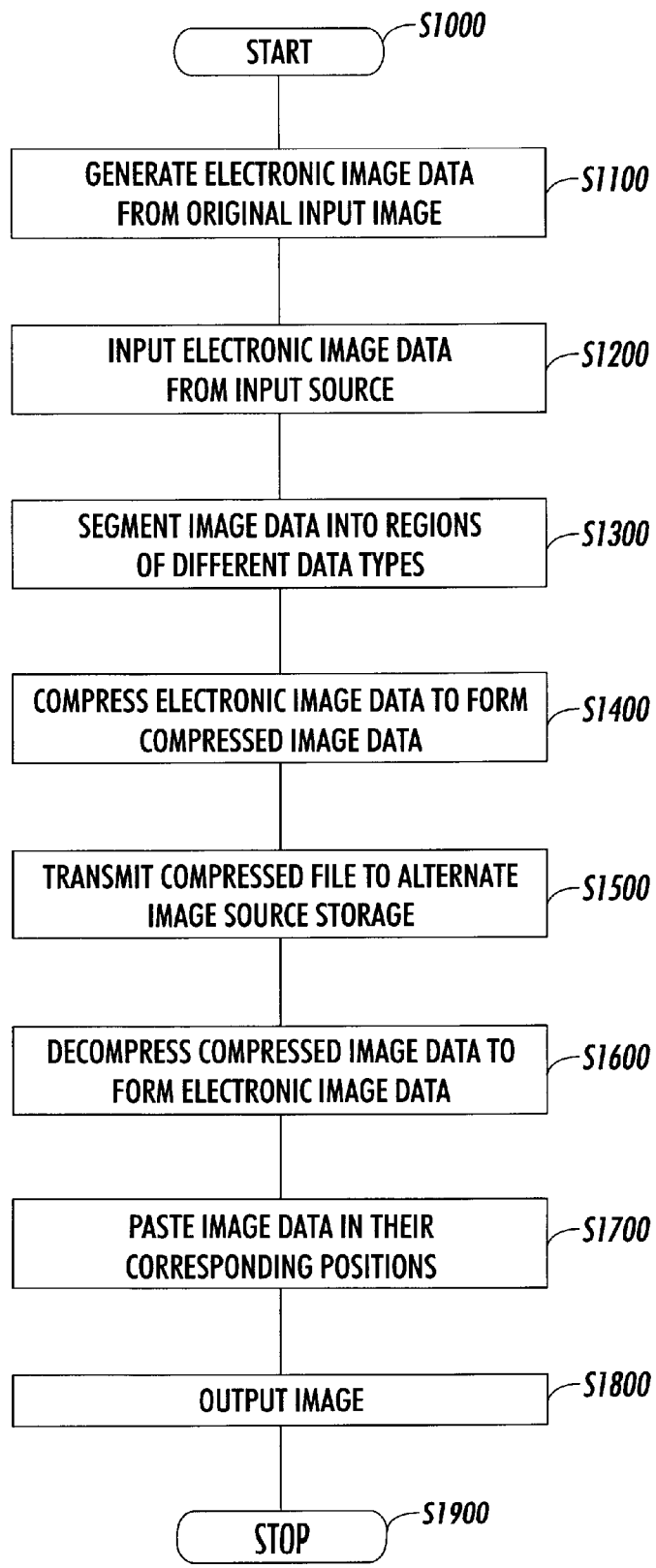
FIG. 5 is a flowchart outlining one embodiment of an image compression and decompression method according to this invention.

FIG. 5 is a flowchart outlining one embodiment of an image compression and decompression method according to this invention. Beginning in step S1000, control continues to step S1100, where electronic image data is generated from an original image. Then, in step S1200, the electronic image data is input from the image source.

It should be appreciated that, while the flowchart of FIG. 5 shows generating the electronic image data as part of the process, this step is not necessarily needed. That is, while the electronic image data can be generated by scanning an original image, or the like, the electronic image data could have been generated at any time in the past. Moreover, the electronic image data need not have been generated from an original physical image, but could have been created from scratch electronically. Accordingly, if electronic image data of the image is already available to the image source, step S1100 can be skipped, with control continuing directly from step S1000 to step S1200.

In step S1300, image data is segmented into regions of different data types, including segments of at least one type of blocked data and segments of at least one type of non-blocked data, or segments of a plurality of types of blocked image data, as described above. Then, in step S1400, compressed image data is generated from the image segments. Next, in step S1500, the compressed image data is transmitted or possibly stored before being transmitted, to a device for decompressing the compressed image data.

In step S1600, the compressed image data is decompressed. Subsequently, in step S1700, the data is pasted into corresponding positions. Next, in step S1800, the image data is output. Then, in step S1900 the control routine ends.

Figure 6:
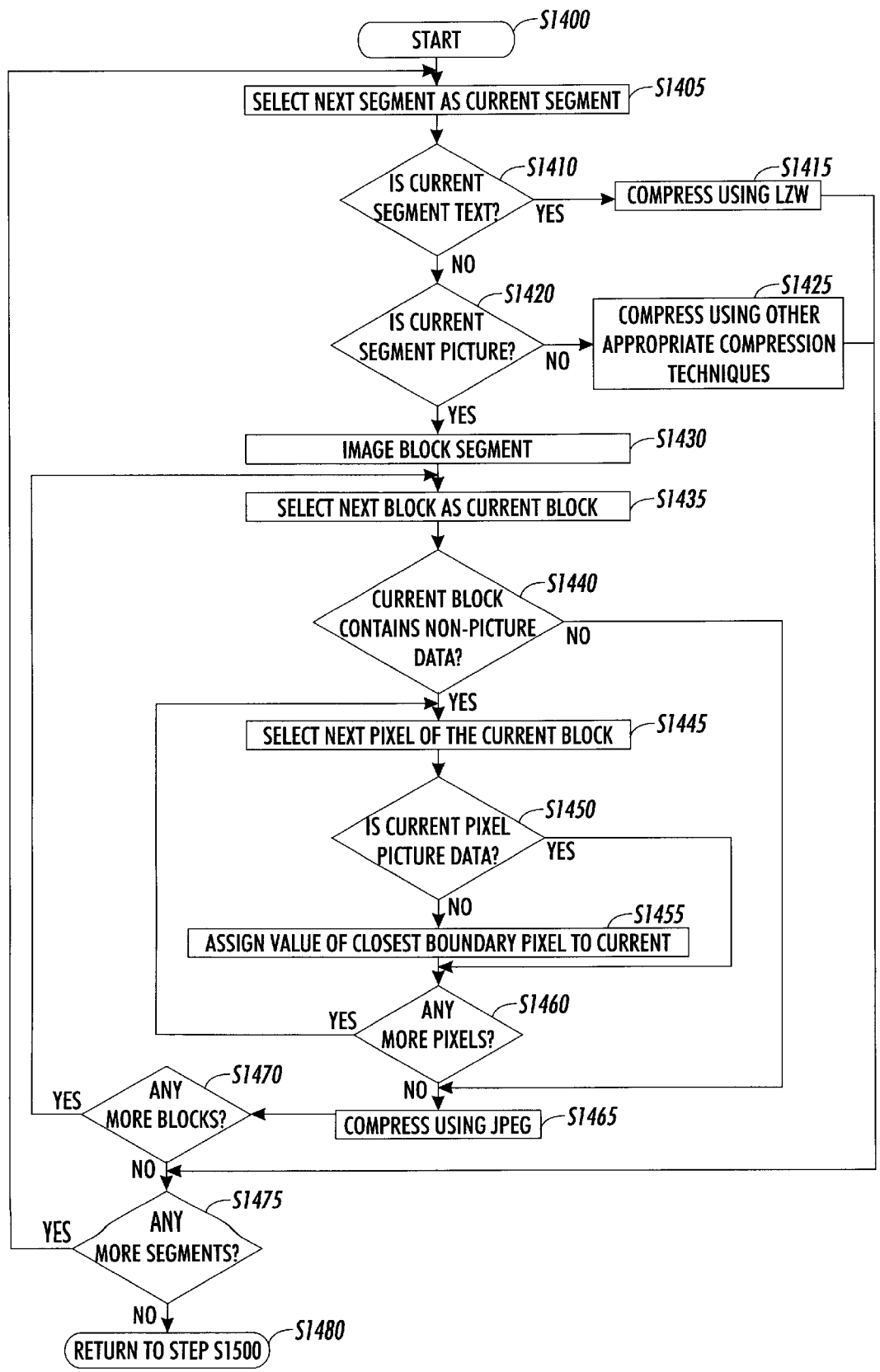
FIG. 6 is a flowchart outlining in greater detail a recursive dilation process according to this invention.

FIG. 6 outlines in greater detail the compression process of step S1400. Beginning in step S1405, the first segment is selected as the current segment. Then in step S1410, the control routine determines if the current segment is a text segment i.e., a non-blocked-data segment. If not, control jumps to step S1420. Otherwise, if the segment is a non-blocked-data segment, control continues to step S1415.

In step S1415, the non-blocked-data segment is compressed using the selected non-blocked-data compression technique, such as LZW for text data. Control then jumps to step S1475.

In step S1420, the control routine determines whether the current segment is a picture segment i.e., a blocked-data segment. If not, the segment contains data other than text or picture and control continues to step S1425. Otherwise, if the segment is a blocked-data segment, control jumps to step S1430.

In step S1425, the non-text and non-picture segment is compressed using other appropriate compression techniques, which themselves may be blocked-data compression techniques that use the recursive dilation technique described herein. Control then jumps to step S1475.

In step S1430, the blocked-data segment containing picture data is divided into picture blocks. Then, in step S1435, the first picture block is selected as the current block.

In step S1440, the control routine determines whether the current block contains missing data i.e., it is a boundary block. If the current block contains missing data, control continues to step S1445. Otherwise, if the current block not is missing any data, control jumps to step S1465.

In step S1445, the next pixel of the current block is input as the current pixel. Then, in step S1450, the control routine determines whether the current pixel is a picture pixel. If not, control continues to step S1455. Otherwise, if the pixel is a picture pixel, control jumps to step S1460.

In step S1455, the value of the closest boundary pixel to the current pixel is assigned to the current pixel. Control then continues to step S1460.

In step S1460, the control routine determines whether there are any more pixels. If so, control returns to step S1445. Otherwise, control continues to step S1465.

In step S1465, the picture block is compressed using the selected picture data compression technique, such as JPEG.

Then in step S1470, the control routine determines whether there are any more blocks to be compressed. If so, control returns to S1435. Otherwise, if all of the blocks have been compressed, control continues to step S1475.

In step S1475, the control routine determines if there are any more data segments to be compressed. If so, control jumps back to step S1405. Otherwise, if all the data segments have been compressed, control continues to step S1480. In step S1480, control returns to step S1500.

It should be appreciated that, if additional compression techniques for compressing additional types of data are also implemented, the data type testing in steps S1410 and S1420 will be expanded to test for segments of these types. Thus, the boundary block testing and missing data filling steps S1440–S1460, and the compressing in steps S1415, 1425 and S1465 will also be expanded or replicated to deal with these additional data types.

Figure 7:
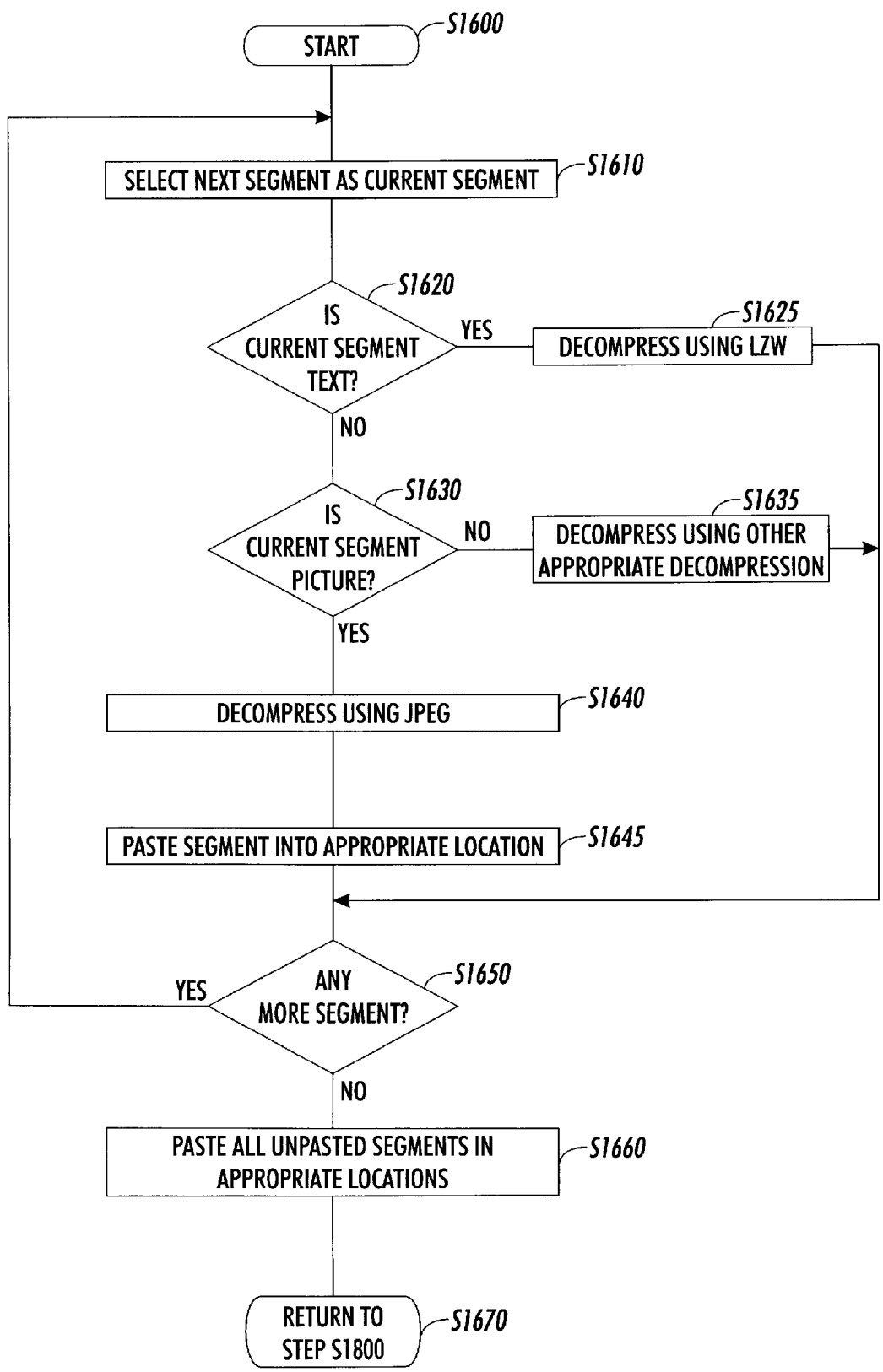
FIG. 7 is a flowchart outlining in greater detail the decompression and pasting process according to this invention.

FIG. 7 outlines in greater detail the decompression and pasting processes of steps S1600 and S1700. Beginning in step S1610, the first segment is selected as the current segment. Then, in step S1620, the control routine determines if the current segment is a text segment i.e., a non-blocked-data segment. If not, control jumps to step S1630. Otherwise, if the segment is a text segment, control continues to step S1625.

In step S1625, the text segment is decompressed using the selected text data decompression technique, such as LZW. Control then jumps to step S1650.

In step S1630, the control routine determines if the segment is a picture segment i.e., a blocked-data segment. If so, control jumps to step S1640. Otherwise, if the segment contains data other than text or picture data, control continues to step S1635.

In step S1635, the non-text and non-picture data segment is decompressed using other appropriate decompression techniques. Control then jumps to step S1650.

In step S1640, the data is decompressed using the selected picture data decompression technique, such as JPEG. Control then continues to step S1645.

In step S1645, the picture data is pasted into the appropriate locations. Control then continues to step S1650.

Then in step S1650, the control routine determines whether there are any more segments to be decompressed. If so, control returns to S1610. Otherwise, if all data have been decompressed, control continues to step S1660.

In step S1660, all unpasted segments, such as the text segments, are pasted into their appropriate locations. Then control continues to S1670.

In step S1670, control returns to step S1800.

FIG. 8 shows an example of the recursive dilation method of this invention for an exemplary 8×8 boundary block of an exemplary data type. The columns range from m=0 to m=7, and the rows range from n=0 to n=7. The vertical region boundary in FIG. 7 is located between columns 4 and 5. The term "y" in the block indicates the brightness component. The data to the right of the region boundary is the missing data. According to the methods and systems of this invention, the recursive dilation method assigns the value of the closest boundary pixel to the pixel with missing data. Thus, for each row n, the value of the pixel (m−1,n), which is the picture pixel in the picture portion adjacent to the boundary, is assigned to the missing value at each pixel (m,n) for m>4. Thus, for the row "0", each missing pixel (5,0), (6,0) and (7,0) is assigned the value of the pixel just to the picture side of the boundary, i.e., the pixel (4,0).

FIG. 9 shows another example of the recursive dilation method of this invention for an exemplary 8×8 boundary block, where a horizontal region boundary is located between rows 1 and 2. The data above the region boundary in FIG. 8 is the missing data. According to the methods and systems of this invention, the recursive dilation method assigns, for each column m, the value of the pixel (m,n+1), which is the picture pixel in the picture portion adjacent to the boundary, to the missing value at each pixel (m,n) for n<2.

FIG. 10 shows another example of the recursive dilation method of this invention for an exemplary 8×8 boundary block, where a vertical region boundary is located between columns 4 and 5, and where a horizontal region boundary is located between rows 5 and 6. The data to the right of the vertical region boundary and below the horizontal region boundary is the missing data. It should be appreciated that if the non-missing data that is both above and to the left of the region boundaries is a first data type, either or both of the vertical and horizontal region boundaries could be between different types of data. That is, the missing data to the right of the vertical boundary could be a second data type, while the missing data below the horizontal boundary could be a third type of data, and the missing data that is both below and to the right of the horizontal and vertical boundaries could be a fourth type of data.

According to the methods and systems of this invention, the recursive dilation method assigns, for each column m and each row n, the value of the pixel (m,n−1), which is the picture pixel in the picture portion adjacent the horizontal region boundary, to the missing value at each pixel (m,n) for n>5 and m<5, while the value of the pixel (m−1,n) in the picture portion adjacent the vertical region boundary is assigned to the missing value at each pixel (m,n) for m>4 and n<6. The missing value at pixel (m,n) for m>4 and n>5 may be assigned the value of its neighbor that is the value of closest boundary pixel. In this instance, the values of both the left neighbor and the upper neighbor equal y45.

FIG. 11 shows another example of the recursive dilation method of this invention for an exemplary 8×8 boundary block, where a vertical region boundary is located between columns 4 and 5, and where a horizontal region boundary is located between rows 2 and 3. The data to the right of the vertical region boundary and below the horizontal region boundary is the missing data. According to the methods and systems of this invention, the recursive dilation method assigns for each column m and each row n, the value of the each pixel (m−1,n), which is the pixel in the picture portion adjacent the vertical region boundary, to the missing value at pixel (m,n) for m>4, while the value of each pixel (m,n−1) in the picture portion adjacent the horizontal boundary is assigned to the missing value at each pixel (m,n) for n>2. The missing values at the pixel (5,3) may be assigned either the value of the left neighbor, the pixel (4,3) or its upper neighbor, the pixel (5,2). If both of the left neighbor and the upper neighbor are missing data, then the assigned values of the closest boundary pixel may be given to the pixel. Thus, for m>5 and n>3, each pixel (m,n) may assigned a value of the closest of the pixel (m−1,n) or the pixel (m,n−1). If both the pixel (m−1,n) and the pixel (m,n−1) are of the same proximity, the value of either may be applied. Thus, the missing values at the pixel (6,4) may be assigned the value of the pixel (4,4) or the pixel (6,2). Similarly, the missing value of the pixel (7,5) may be assigned the value of the pixel (4,5) or the pixel (7,2).

In the examples described above, the pixels containing missing data are assigned the values of the boundary pixels closest to the pixel containing the missing data. It is to be appreciated that any conceivable method may be applied in which the values of the closest boundary pixels are assigned to the pixel containing the missing data. In accordance with the methods and systems of this invention, the observable artifacts caused by the missing data is eliminated.

As shown in FIG. 2, the encoder 400 is preferably implemented on a programmed general purpose computer. However, the encoder 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing steps S1300–S1400 of FIGS. 5 and 6, can be used to implement the encoder 400.

Similarly, though FIG. 2 shows the decoder 500 being preferably implemented on a programmed general purpose computer, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing steps S1600–S1700 of FIGS. 5 and 7, can be used to implement the decoder 500.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

What is claimed is:

1. A method for compressing an image, comprising:
   dividing the image into image segments, the image segments including at least one segment of a first type and at least one segment of a second type, wherein at least each at least one segment of the first type is divided into image blocks and compressed on a block-by-block basis, and at least one of the image blocks of the at least one segment of the first type contains a boundary between data of the first type and missing data, each image block comprising a plurality of pixels, and each pixel having a value;
   identifying each image block containing a boundary with missing data;
   recursively replacing the missing data of each first type boundary block with first type data by assigning the value of a closest boundary pixel;
   compressing each first type image block and each first type boundary block using a first compression technique; and
   compressing each at least one segment of the second type using a second compression technique.

2. The method of claim 1, wherein the step of recursively replacing comprises determining, for each pixel of the missing data of the first type boundary block, whether that pixel is adjacent to a boundary pixel of the first type.

3. The method of claim 2, wherein assigning the value of the closest boundary pixel comprises assigning the value of the boundary pixel to the pixels of the missing data of the first type boundary block determined to be adjacent to the boundary pixel.

4. The method of claim 2, wherein assigning the value of the closest boundary pixel comprises assigning the value of an adjacent pixel to the pixels of the missing data of the first type boundary block determined not to be adjacent to the boundary pixel.

5. The method of claim 4, wherein the value of the adjacent pixel assigned is the value of the closest boundary pixel.

6. The method of claim 1, wherein the first compression technique is JPEG.

7. The method of claim 1, wherein the second compression technique is LZW.

8. The method of claim 1, wherein:
dividing the image into image segments further comprises dividing the image into at least one segment of a third type; and
the method further comprises compressing each third type segment using a third compression technique.

9. The method of claim 1, wherein dividing the image into image segments and dividing the segments into image blocks are performed concurrently.

10. The method of claim 1, where at least each at least one segment of the second type is divided into image blocks and compressed on a block-by-block basis, and at least one of the image blocks of the at least one segment of the second type contains a boundary between data of the second type and missing data, each second type image block comprising a plurality of pixels, and each pixel of the second type having a value, the method further comprising:
identifying each second type image block containing a boundary with missing data;
recursively replacing the missing data of each second type boundary block with second type data; and
compressing each second type image block and each second type boundary block using the second compression technique.

11. An apparatus for compressing an image, comprising:
an image segmenting portion that divides the image into image segments, the image segments including at least one segment of a first type and at least one segment of a second type;
a segment blocking portion that divides each at least one segment of the first type into image blocks, on a block-by-block basis, at least one of the image blocks of the at least one segment of the first type containing a boundary between data of the first type and missing data, each image block comprising a plurality of pixels, and each pixel having a value;
a block analyzer that identifies each image block containing a boundary with missing data;
a recursive dilation data generator that recursively replaces the missing data of each first type boundary block with first type data by assigning the value of a closest boundary pixel;
a first compressor that compresses each first type image block and each first type boundary block on a block-by-block basis, using a first compression technique; and
a second compressor that compresses each at least one segment of the second type using a second compression technique.

12. The apparatus of claim 11, wherein the recursive dilation data generator determines, for each pixel of the missing data of the first type boundary block, whether that pixel is adjacent to a boundary pixel of the first type.

13. The apparatus of claim 12, wherein the recursive dilation data generator assigns the value of the boundary pixel to the pixels of the missing data of the first type boundary block determined to be adjacent to the boundary pixel.

14. The apparatus of claim 12, wherein the recursive dilation data generator assigns the value of an adjacent pixel to the pixels of the missing data of the first type boundary block determined not to be adjacent to the boundary pixel.

15. The apparatus of claim 14, wherein the value of the adjacent pixel assigned is the value of the closest boundary pixel.

16. The apparatus of claim 11, wherein the first compression technique is JPEG.

17. The apparatus of claim 11, wherein the second compression technique is LZW.

18. The apparatus of claim 11, wherein:
the image segmenting portion further divides the image into at least one segment of a third type; and
the apparatus further comprises a third compressor that compresses each third type segment using a third compression technique.

19. The apparatus of claim 11, wherein the image segmenting portion includes the image blocking portion and concurrently divides the image into image segments and divides the segments into image blocks.

20. The apparatus of claim 11, wherein:
the image blocking portion divides each at least one segment of the second type into image blocks, at least one of the image blocks of the at least one segment of the second type containing a boundary between data of the second type and missing data, each second type image block comprising a plurality of pixels, and each pixel of the second type having a value;
the block analyzer identifies each second type image block containing a boundary with missing data;
the recursive dilation data generator recursively replaces the missing data of each second type boundary block with second type data; and
the second compressor compresses each second type image block and each second type boundary block on a block-by-block basis, using the second compression technique.

* * * * *